C. H. TURVER.
SAW-SET.
No. 190,647. Patented May 8, 1877.
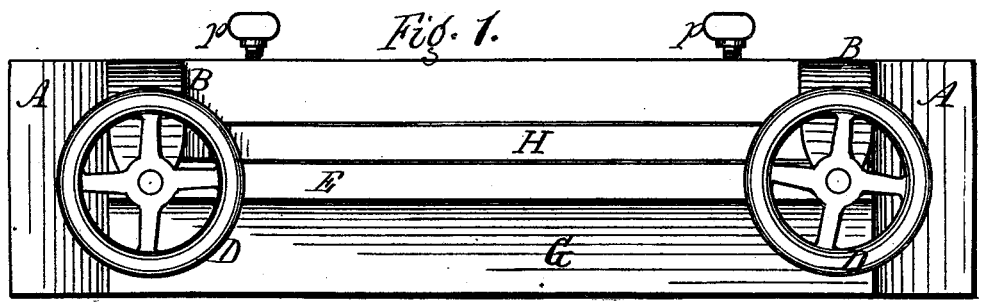
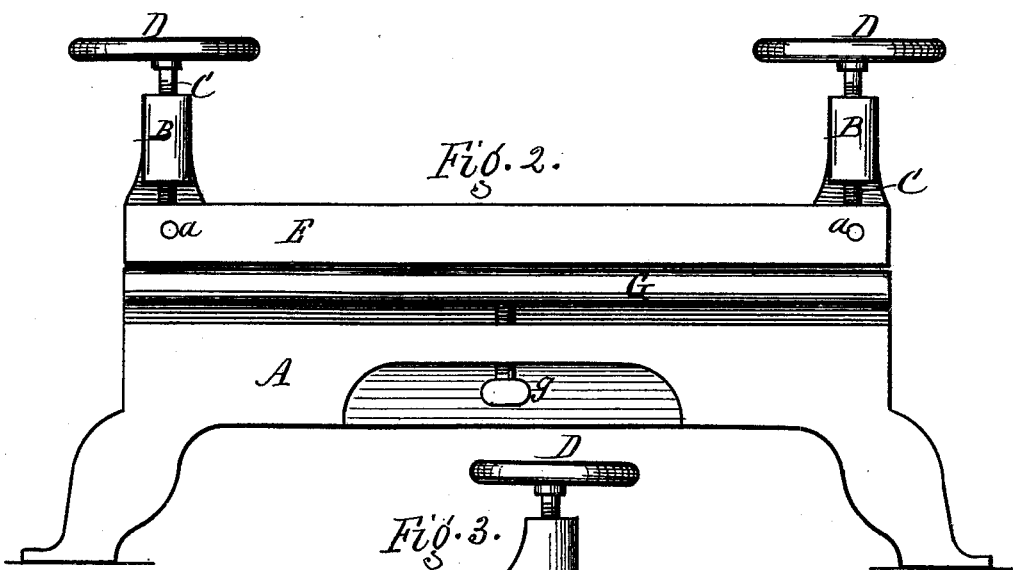
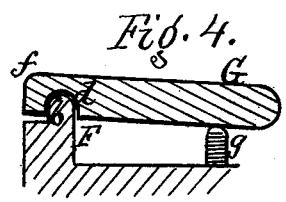  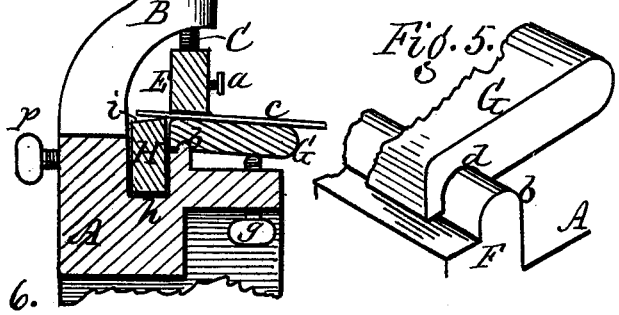
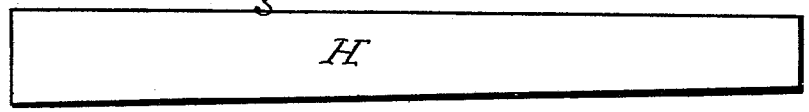
Attest.
Louis S. Jahn
R. E. White
Inventor.
Chas. H. Turver
per R. F. Osgood,
Atty.
N. PETERS, PHOTO-LITHOGRAPHER, WASHINGTON, D. C.

UNITED STATES PATENT OFFICE.

CHARLES H. TURVER, OF ROCHESTER, NEW YORK, ASSIGNOR, BY MESNE ASSIGNMENTS, TO STELLA TURVER, OF SAME PLACE.

IMPROVEMENT IN SAW-SETS.

Specification forming part of Letters Patent No. 190,647, dated May 8, 1877; application filed March 21, 1877.

*To all whom it may concern:*

Be it known that I, CHARLES H. TURVER, of the city of Rochester, in the county of Monroe and State of New York, have invented a certain new and useful Improvement in Saw-Sets; and I do hereby declare that the following is a full, clear, and exact description of the construction and operation of the same, reference being had to the accompanying drawings, in which—

Figure 1 is a plan. Fig. 2 is a side elevation. Fig. 3 is a cross-section. Figs. 4 and 5 are detail views.

My improvement relates to saw-sets, in which the saw is clamped upon a tilting table, and a beveled die or bed is used beneath the teeth for gaging the "set."

The invention consists in the combination of parts hereinafter more fully described and definitely claimed.

A represents the frame for supporting the parts. B B are standards at the ends, in which rest screws C C operated by hand-wheels D D, or any equivalent means. E is a clamp-bar, consisting of a bar of metal extending lengthwise of the machine and swiveled to the screws, so as to be raised and lowered by them. F is a raised portion of the frame, also extending lengthwise and resting directly under the clamp. It has at the top a rounded rib, $b$, which forms the bearing to the tilting table. G is the tilting table. It is a flat leaf, on which the saw $c$ rests. It is adjusted up and down at the outer edge by a screw, $g$, to support the saw at different angles. Near its inner edge, on the under side, it has a half-round groove, $d$, which rests loosely upon the bearing $b$, as shown most clearly in Figs. 4 and 5. The inner edge projects necessarily a little beyond the groove, and the top edge is preferably rounded off, as shown at $f$. H is the die-bar or bed, upon which the teeth of the saw are struck to produce the set.

A punch of any suitable kind is employed for the purpose. This die is a bar of steel, and is beveling backward on its top, as shown in Fig. 3. It is wedge-shaped in the longitudinal direction, one end being narrower than the other, as shown in Fig. 6. The slot $h$, in the main frame, in which the die rests, is also made wedge-shaped.

By this means, when the die is pushed in or drawn out, it is correspondingly raised or lowered vertically. The die is made somewhat longer than the frame to enable this vertical adjustment to be produced. Several of the dies may be employed with a single machine, if desired, to adapt them to different kinds of saws.

One special advantage in my invention results from the connection of the tilting table G with the bearing F of the main frame, by the round head $b$ and corresponding groove $d$.

By this means a loose connection is made, which allows easy separation of the parts; also, the table rocks and turns easily without being thrown out of position, and still produces a firm and unyielding contact of the parts directly under the clamp, and in line with the same its whole length. It also allows free end movement of the tilting table to adjust the position of the saw, or to feed it forward, which could not be done if the table were fixed or attached by permanent hinges. In these respects it is more effective than the old form of table.

By making the die wedge-shaped, as described, and making it movable endwise its upper edge can be adjusted to the position of the inner edge of the table by moving it out or in. It is held in any position by set-screws $p$ $p$.

Having thus described my invention, what I claim herein as new is—

In a saw-set, having a die-bar, H, and clamp-bar E, the tilting table G, provided with a groove, $d$, near its inner edge, resting upon a rounded bearing, $b$, all in combination, as shown and described, and for the purpose specified.

In witness whereof I have hereunto signed my name in the presence of two subscribing witnesses.

CHARLES H. TURVER.

Witnesses:
R. F. OSGOOD,
EDWIN SCOTT.